US009032456B2

(12) United States Patent
Pierson et al.

(10) Patent No.: US 9,032,456 B2
(45) Date of Patent: May 12, 2015

(54) MODIFYING COMMERCIALS FOR MULTI-SPEED PLAYBACK

(75) Inventors: Andrew Pierson, Sunnyvale, CA (US);
Craig Seidel, Palo Alto, CA (US);
James M. Barton, Alviso, CA (US)

(73) Assignee: TiVo Inc., Alviso, CA (US)

(*) Notice: Subject to any disclaimer, the term of this patent is extended or adjusted under 35 U.S.C. 154(b) by 785 days.

(21) Appl. No.: 10/958,897

(22) Filed: Oct. 4, 2004

(65) Prior Publication Data
US 2005/0076359 A1    Apr. 7, 2005

Related U.S. Application Data

(63) Continuation-in-part of application No. 09/740,618, filed on Dec. 18, 2000.

(60) Provisional application No. 60/508,769, filed on Oct. 2, 2003, provisional application No. 60/171,829, filed on Dec. 21, 1999.

(51) Int. Cl.
*H04N 7/173* (2011.01)
*H04N 21/433* (2011.01)
(Continued)

(52) U.S. Cl.
CPC ..... *H04N 21/4331* (2013.01); *H04N 21/47217* (2013.01); *G11B 27/005* (2013.01); *G11B 27/105* (2013.01); *G11B 27/34* (2013.01); *G11B 2220/20* (2013.01); *H04N 5/44513* (2013.01);
(Continued)

(58) Field of Classification Search
CPC ............ H04N 21/4147; H04N 21/432; H04N 21/4325; H04N 21/4331; H04N 21/4334; H04N 21/47217; H04N 21/812

USPC .............................................. 725/36, 135, 32
See application file for complete search history.

(56) References Cited

U.S. PATENT DOCUMENTS

| 5,271,626 A | 12/1993 | Lienas et al. .................. 273/430 |
| 5,371,551 A | 12/1994 | Logan et al. |

(Continued)

FOREIGN PATENT DOCUMENTS

| EP | 1 367 588 A | 12/2003 |
| JP | 1996-123821 | 5/1996 |

(Continued)

OTHER PUBLICATIONS

Metabyte Announces Personalized TV Software; PR Newswire, Jan. 21, 1999.

(Continued)

*Primary Examiner* — Jeremy Duffield
(74) *Attorney, Agent, or Firm* — Wong & Rees LLP

(57) ABSTRACT

A system for modifying commercials for multi-speed playback detects when a commercial break begins in a broadcast program content stream. If the viewer selects fast-forward playback mode during the commercial break, then the system selects the appropriate alternate content to be played to the viewer. The alternate content can include images, video, and/or audio content. The system is provided configuration information by the service provider or broadcaster to identify what alternate content will be played, when it will be played and any additional processing tasks required. A service provider can charge an advertiser or content provider a fee based on viewership of the alternate content. When the system detects that the commercial break has ended, it returns the viewer back to the program material.

77 Claims, 11 Drawing Sheets

(51) Int. Cl.

| | | |
|---|---|---|
| *H04N 21/472* | (2011.01) | |
| *G11B 27/00* | (2006.01) | |
| *G11B 27/10* | (2006.01) | |
| *H04N 5/445* | (2011.01) | |
| *H04N 5/76* | (2006.01) | |
| *H04N 5/782* | (2006.01) | |
| *H04N 7/16* | (2011.01) | |
| *H04N 21/25* | (2011.01) | |
| *H04N 21/2547* | (2011.01) | |
| *H04N 21/258* | (2011.01) | |
| *H04N 21/4147* | (2011.01) | |
| *H04N 21/432* | (2011.01) | |
| *H04N 21/44* | (2011.01) | |
| *H04N 21/442* | (2011.01) | |
| *H04N 21/45* | (2011.01) | |
| *H04N 21/454* | (2011.01) | |
| *H04N 21/466* | (2011.01) | |
| *H04N 21/482* | (2011.01) | |
| *H04N 21/485* | (2011.01) | |
| *H04N 21/6543* | (2011.01) | |
| *H04N 21/81* | (2011.01) | |
| *H04N 21/84* | (2011.01) | |
| *H04N 21/845* | (2011.01) | |
| *G11B 27/34* | (2006.01) | |
| *H04N 5/781* | (2006.01) | |
| *H04N 5/85* | (2006.01) | |
| *H04N 5/907* | (2006.01) | |
| *H04N 9/804* | (2006.01) | |
| *H04N 5/44* | (2011.01) | |

(52) U.S. Cl.
CPC ............. *H04N 5/44543* (2013.01); *H04N 5/76* (2013.01); *H04N 5/781* (2013.01); *H04N 5/782* (2013.01); *H04N 5/85* (2013.01); *H04N 5/907* (2013.01); *H04N 7/163* (2013.01); *H04N 7/173* (2013.01); *H04N 7/17318* (2013.01); *H04N 7/17354* (2013.01); *H04N 9/8042* (2013.01); *H04N 21/252* (2013.01); *H04N 21/2547* (2013.01); *H04N 21/25891* (2013.01); *H04N 21/4147* (2013.01); *H04N 21/4325* (2013.01); *H04N 21/4334* (2013.01); *H04N 21/44008* (2013.01); *H04N 21/44016* (2013.01); *H04N 21/44222* (2013.01); *H04N 21/4532* (2013.01); *H04N 21/454* (2013.01); *H04N 21/4663* (2013.01); *H04N 21/4825* (2013.01); *H04N 21/4826* (2013.01); *H04N 21/4828* (2013.01); *H04N 21/485* (2013.01); *H04N 21/6543* (2013.01); *H04N 21/812* (2013.01); *H04N 21/8153* (2013.01); *H04N 21/84* (2013.01); *H04N 21/8455* (2013.01); *H04N 2005/4441* (2013.01)

(56) References Cited

U.S. PATENT DOCUMENTS

| | | | |
|---|---|---|---|
| 5,600,364 A | | 2/1997 | Hendricks et al. |
| 5,659,539 A * | | 8/1997 | Porter et al. ..................... 725/87 |
| 5,696,866 A | | 12/1997 | Iggulden et al. |
| 5,781,227 A | | 7/1998 | Goode et al. |
| 5,790,935 A | | 8/1998 | Payton |
| 5,812,732 A | | 9/1998 | Dettmer et al. |
| 5,838,314 A | | 11/1998 | Neel et al. |
| 5,855,008 A | | 12/1998 | Goldhaber |
| 5,892,536 A | | 4/1999 | Logan et al. |
| 5,911,029 A | | 6/1999 | Sakaguchi et al. |
| 5,957,695 A | | 9/1999 | Redford et al. |
| 5,974,218 A | | 10/1999 | Nagasaka et al. |
| 5,987,210 A * | | 11/1999 | Iggulden et al. ................. 386/46 |
| 5,999,688 A | | 12/1999 | Iggulden et al. |
| 6,072,982 A | | 6/2000 | Haddad |
| 6,100,941 A | | 8/2000 | Dimitrova et al. |
| 6,169,542 B1 | | 1/2001 | Hooks et al. |
| 6,181,364 B1 | | 1/2001 | Ford |
| 6,185,574 B1 | | 2/2001 | Howard et al. |
| 6,236,801 B1 | | 5/2001 | Engle et al. |
| 6,249,863 B1 | | 6/2001 | Redford et al. |
| 6,262,951 B1 | | 7/2001 | Shimizu et al. |
| 6,304,852 B1 | | 10/2001 | Loncteaux |
| 6,404,977 B1 | | 6/2002 | Iggulden |
| 6,473,903 B2 | | 10/2002 | Balakrishnan et al. |
| 6,496,981 B1 | | 12/2002 | Wistendahl et al. |
| 6,574,416 B1 | | 6/2003 | Posa et al. |
| 6,698,020 B1 | | 2/2004 | Zigmond et al. |
| 6,788,882 B1 | | 9/2004 | Geer et al. |
| 6,799,327 B1 | | 9/2004 | Reynolds et al. |
| 6,909,837 B1 * | | 6/2005 | Unger ............................. 386/68 |
| 7,110,658 B1 | | 9/2006 | Iggulden et al. |
| 7,155,451 B1 | | 12/2006 | Torres |
| 7,159,232 B1 | | 1/2007 | Blakketter et al. |
| 7,225,142 B1 | | 5/2007 | Apte et al. |
| 7,269,330 B1 | | 9/2007 | Iggulden |
| 7,395,546 B1 | | 7/2008 | Asmussen |
| 7,779,437 B2 | | 8/2010 | Barton |
| 7,818,763 B2 | | 10/2010 | Sie et al. |
| 7,877,766 B1 | | 1/2011 | Wu et al. |
| 2001/0052135 A1 * | | 12/2001 | Balakrishnan et al. ........ 725/135 |
| 2002/0010775 A1 | | 1/2002 | Rakavy et al. |
| 2002/0048349 A1 | | 4/2002 | Bixler et al. |
| 2002/0057893 A1 | | 5/2002 | Wood et al. |
| 2002/0124250 A1 * | | 9/2002 | Proehl et al. ..................... 725/32 |
| 2002/0124255 A1 | | 9/2002 | Reichardt et al. |
| 2002/0144262 A1 * | | 10/2002 | Plotnick et al. .................. 725/32 |
| 2002/0184047 A1 * | | 12/2002 | Plotnick et al. .................... 705/1 |
| 2002/0191950 A1 * | | 12/2002 | Wang ............................... 386/46 |
| 2002/0194592 A1 * | | 12/2002 | Tsuchida et al. ................. 725/32 |
| 2003/0014747 A1 * | | 1/2003 | Spehr .............................. 725/22 |
| 2003/0037068 A1 | | 2/2003 | Thomas et al. |
| 2003/0053540 A1 * | | 3/2003 | Wang et al. ............... 375/240.12 |
| 2003/0152363 A1 | | 8/2003 | Jeannin et al. |
| 2003/0154128 A1 | | 8/2003 | Liga |
| 2003/0184679 A1 | | 10/2003 | Meehan |
| 2004/0103429 A1 * | | 5/2004 | Carlucci et al. .................. 725/32 |
| 2004/0125761 A1 * | | 7/2004 | Yamaguchi et al. ........... 370/312 |
| 2004/0268384 A1 * | | 12/2004 | Stone .............................. 725/32 |
| 2005/0273828 A1 | | 12/2005 | Barton |
| 2006/0013556 A1 | | 1/2006 | Poslinski |
| 2010/0280876 A1 | | 11/2010 | Bowra |
| 2011/0116766 A1 | | 5/2011 | Sie et al. |

FOREIGN PATENT DOCUMENTS

| | | |
|---|---|---|
| JP | 1998-512420 | 11/1998 |
| JP | 1998-336590 | 12/1998 |
| WO | WO 98/03016 A1 | 1/1998 |
| WO | WO 99/30493 A1 | 6/1999 |
| WO | WO 99/31879 | 6/1999 |
| WO | WO 99/38321 | 7/1999 |
| WO | WO 01/47279 A | 6/2001 |
| WO | WO 01/47279 A2 | 6/2001 |
| WO | WO 02/19710 A | 3/2002 |
| WO | WO 03079690 A1 | 9/2003 |
| WO | WO 2005/034503 A3 | 4/2005 |

OTHER PUBLICATIONS

International Preliminary Examining Authority, "Notification of Transmittal of International Preliminary Examination Report," Apr. 2, 2002, 13 pages.
Current Claims of International Application No. PCT/US00/34819, 4 pages.
Gales, Ron, "Creatives Find 'Bookends' a Solution to Viewer Apathy," Jan. 2, 1989, ADWEEK Eastern Edition, v30, n1, p. 43.
"Audi ads focus on technology," Nov. 1, 1993, Automotive News, v0, n0, p. 2.
Claims, application No. PCT/US04/32757, 11 pages.

(56) References Cited

OTHER PUBLICATIONS

International Searching Authority, "EPO Communication of the Supplemental International Search Report", dated Oct. 26, 2007, 3 pages.
Claims, application No. PCT/US04/32757, 10 pages.
International Searching Authority, "Notification of Transmittal of The International Search Report and The Written Opinion of The International Searching Authority, or The Declaration", dated May 11, 2007, 13 pages.
European Patent Office, "Communication pursuant to Article 94(3) EPC", Application No. 04794197.6-1522, dated Jun. 12, 2008, 5 pages.
Claims, Application No. 04794197.6-1522, 5 pages.
European Patent Office, "Communication pursuant to Article 94(3) EPC", Application No. 04794197.6-1522, dated May 3, 2009, 3 pages.
Claims, Application No. 04794197.6-1522, 11 pages.
State Intellectual Property Office of PRC "The first Office Action", mailed Mar. 13, 2009, serial No. 200480033609.3, Applicant: Tivo Inc., 14 pages.
Current Claims for SIPO PRC application No. 200480033609.3, (10 pages).
EPO Office Action, dated Jun. 30, 2009, application No. 04 794 197.5-1522, Applicant: Tivo Inc., (6 pages).
Current Claims for EPO foreign patent application No. 04 794 197.5-1522, (6 pages).
English translation of Japanese "Notice of Reasons for Preliminary Rejection", Application No. 2006-534256, notice dated Jun. 16, 2010, applicant: TiVo Inc., 3 pages.
Current pending claims for Japanese patent application No. 2006-534256, 10 pages, dated Jun. 2010.
Japanese Patent Office, "Official Notice for Preliminary Rejections (English translation)", Japan app No. 2001-547844, dated Apr. 16, 2010, 3 pages.
Current Claims, Japan app No. 2001-547844, 14 pages, dated Apr. 2010.
Chinese Office Action received in International application No. 200480033609.3 dated Sep. 29, 2010 (18 pages).
Chinese Final Office received in International application No. 200480033609.3 dated Aug. 31, 2010 (10 pages).
Chinese Current Claims in International application No. 200480033609.3 dated Sep. 2010 (7 pages).
Office action, CN Application No. 200480033609.3, dated Oct. 9, 2013, 13 pages.
Claims from CN application No. 200480033609.3, dated Oct. 2013, 4 pages.
The State Intellectual Property Office of the People's Republic of China, "Notification of the Fifth Office Action" in application No. 20048003609.3, dated Apr. 30, 2014, 15 pages.
Current Claims in China application No. 20048003609.3, dated Apr. 2014, 4 pages.
State Intellectual Property Office of PRC, Second Office Action, mailed Jan. 8, 2010, serial No. 200480033609.3, Applicant: Tivo Inc., 14 pages.
Current Claims for SIPO PRC application No. 200480033609.3, 7 pages.
European Patent Office, "European Search Report", EPO application No. 09013842.1-1522, 6 pages.

* cited by examiner

MODIFYING COMMERCIALS FOR MULTI-SPEED PLAYBACK

CROSS-REFERENCES TO RELATED APPLICATIONS

This application claims benefit of Provisional Appln. 60/508,769, filed Oct. 2, 2003, the entire contents of which is hereby incorporated by reference as if fully set forth herein, under 35 U.S.C. §119(e). This application also claims benefit as a Continuation-in-part of application Ser. No. 09/740,618, filed Dec. 18, 2000, which further claims benefit of Provisional Appln. 60/171,829, filed Dec. 21, 1999 the entire contents of which is hereby incorporated by reference as if fully set forth herein, under 35 U.S.C. §120.

BACKGROUND OF THE INVENTION

1. Technical Field

The invention relates to the storing and viewing of television program material in a computer environment. More particularly, the invention relates to playing alternate content during high-speed playback of commercials.

2. Description of the Prior Art

The introduction of Digital Video Recorders (DVR) has revolutionized the television recording industry. DVRs store program material onto a storage medium that is easily accessible, reusable, and the recording does not degrade over time as with videotapes.

DVRs give the viewer an unprecedented amount of control over how the viewer watches live and recorded television programs. One of the effects of the DVRs is that as viewers watch television programs stored on the DVR's storage medium, they have a tendency to skip over the commercial breaks.

Television broadcasters and advertisers have a negative viewpoint of the advent of the DVR. The feeling is that the DVR is destroying any purpose of advertising on the broadcast medium. Primetime no longer exists because viewers are not tied to the broadcaster's schedule. DVRs allow the viewer to easily store all of his desired programs for later viewing.

Broadcasters generate their revenue through the value of the commercial spots. Advertisers feel that they are losing their potential viewership "eyes." If advertisers do not believe that there is any value in a primetime commercial spot, then the broadcasters lose large proportions of their revenue.

On the other hand, DVR service providers also generate revenue through commercials. There is an extremely large potential market for specialized advertising that is shown directly to the target audience. DVRs have the ability to evaluate the viewer's viewing preferences and make inferences as to the viewer's lifestyle. With this personal information the DVR service providers can directly target the correct audience for advertisers.

It would be advantageous to provide a system for modifying commercials for high-speed playback that allows content providers to retain and improve the value of a certain portion of television commercial breaks. It would further be advantageous to provide a system for modifying commercials for high-speed playback that allows service providers to present advertisements to viewers in advertising space that would normally be skipped by the viewers.

SUMMARY OF THE INVENTION

The invention provides a system for modifying commercials for multi-speed playback. The system allows the content provider or advertiser to retain and improve the value of a certain segment of television commercial breaks. In addition, the invention provides a system that allows the service provider to present advertisements to viewers in advertising space that would normally be skipped by the viewers.

The invention detects when a commercial break begins in a broadcast program content stream. If the viewer selects fast-forward playback mode during the commercial break, then the system selects the appropriate alternate content to be played to the viewer. The alternate content can include images, video, and/or audio content.

The system can use a play list that identifies channels and times for affected commercials and the alternate content to be played. The system can automatically detect the appropriate commercial either by the existence of an alternate content set for the specific commercial or by some advanced method such as pattern recognition.

The system is provided configuration information by the service provider or broadcaster to identify what alternate content will be played, when it will be played and any additional processing tasks required. The information can also contain business data that identifies whether the system is authorized to play the alternate content.

More than one set of alternate content for a specific commercial or commercial break can be provided to the system. The system can select which one to display based on a variety of factors such as user characteristics, time or date when played, or random selection.

The system can collect data regarding the playing of alternate content for billing purposes. A service provider can charge an advertiser or content provider a fee based on the data.

When the system detects that the commercial break has ended, it returns the viewer back to the program material.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a system for modifying commercials for multi-speed playback. A system according to the invention allows the content provider or advertiser to retain and improve the value of a certain segment of television commercial breaks. In addition, the invention provides a system that allows a service provider to present advertisements to viewers in advertising space that would normally be skipped by the viewers.

Figure 1:
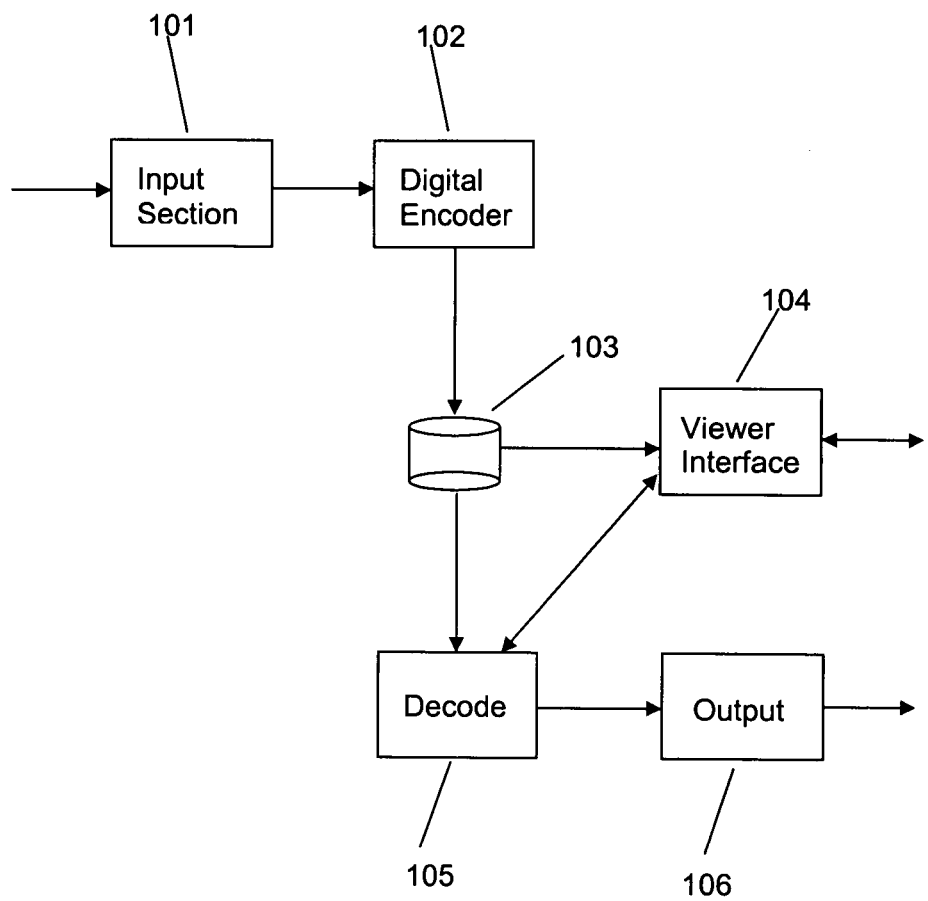
FIG. 1 is a block schematic diagram of an embodiment of a digital video recording system according to the invention.

Referring to FIG. 1, time-shifting devices, or DVRs, take as input television broadcast signals from multiple signal sources. One such method is described in U.S. Pat. No. 6,233,389, entitled "Multimedia Time Warping System", owned by the Applicant. The Input Section 101 selects the input source and directs the signal to the Digital Encoder 102. If the signal source is analog, the Digital Encoder 102 converts the analog signal to a digital form, e.g., MPEG2. For digital signals such as digital satellite feeds, the Digital Encoder 102 can directly store the digital signal or convert the digital signal to a different sample rate.

Digital signals are stored on a persistent storage device 103, e.g., a magnetic hard disk, optical disk, or RAM device. Multiple programs are stored on the storage device 103 and are easily accessed by the viewer. The viewer selects the desired program stored on the storage device 103 through the Viewer Interface 104. Live programs that the viewer tunes to are cached on the storage device 103 as the program is broadcast. The viewer selects a program via an electronic program guide through the Viewer Interface 104.

The selected program is accessed from the storage device 103 and decoded into analog or digital form for presentation onto a television set or monitor by the Decode module 105. If the display is a digital monitor, for example, the Decode module 105 converts the stored program into the proper digital format. The Output module 106 presents the Decode module's 105 output into an acceptable signal format (analog or digital) to the viewer's television or monitor.

Figure 2:
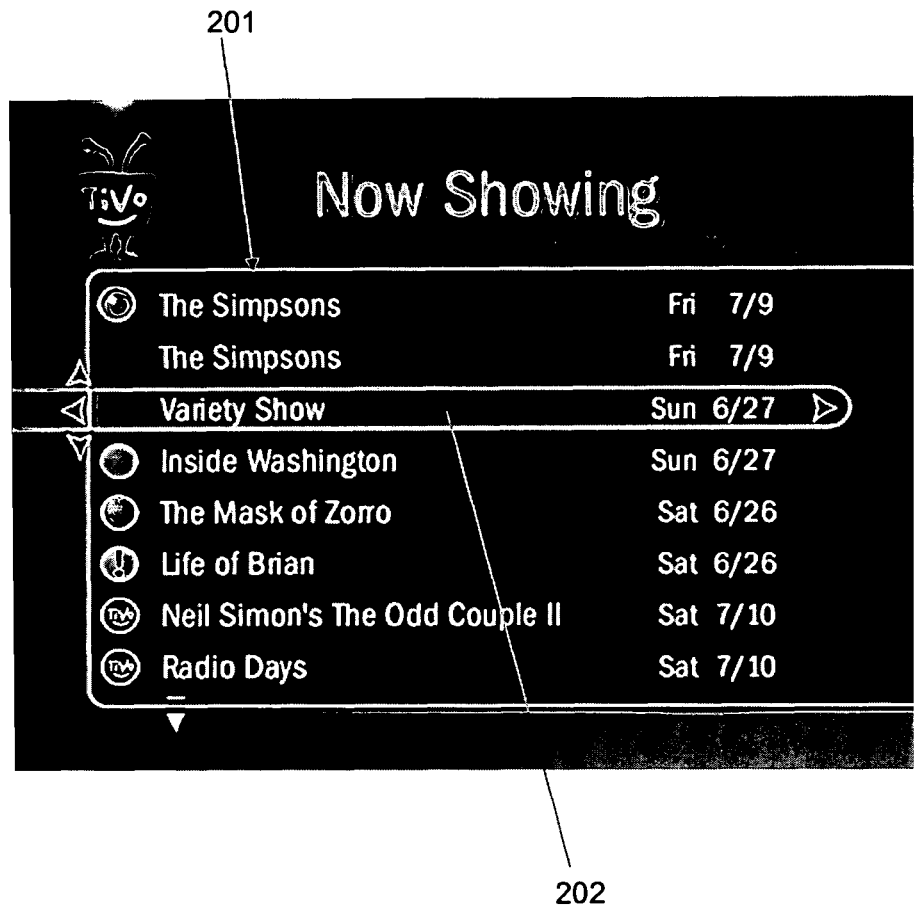
FIG. 2 is a diagram of a screenshot of a user interface menu listing recorded programs according to the invention.
Figure 3:
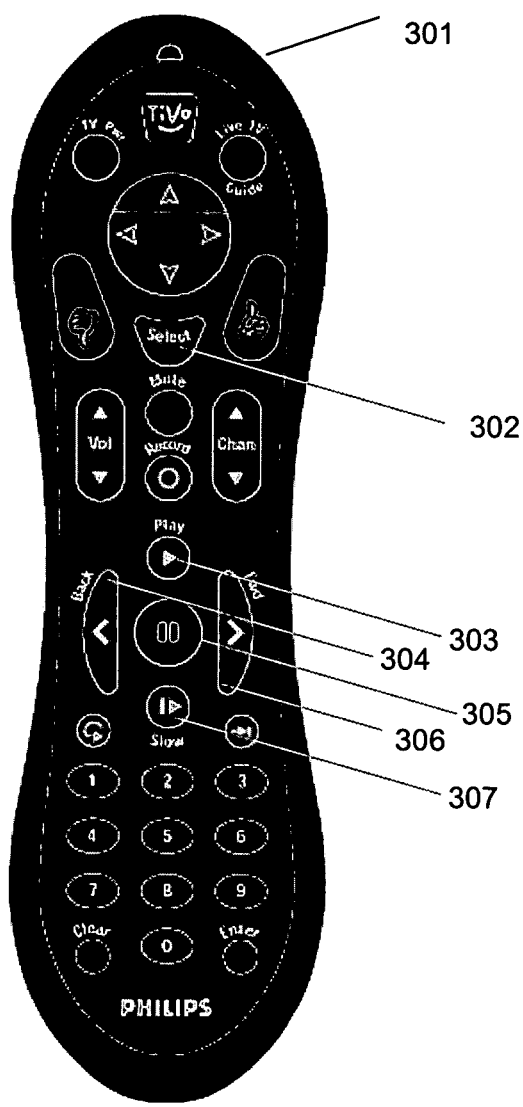
FIG. 3 is a diagram of an exemplary remote input device according to the invention.

With respect to FIGS. 2 and 3, an embodiment of the invention presents the viewer with a list 201 of the programs stored on the storage device. The viewer highlights the desired program using a remote input device 301. The program is then selected when the viewer presses the select button 302. Each program is randomly accessible; a program may be viewed and deleted irrespective of its recorded sequence. This is unlike videocassette tapes that do not give the viewer the convenience of easily accessing a particular recorded program on a tape or inserting new recordings amidst a populated tape.

Additionally, televised, or live, programs are cached on the storage device as the program is being played to the viewer. Programs may be available by simply selecting a channel, either with the remote input device 301, keypad, or by other methods such as an electronic program guide screen. In this case, the entire program or a portion of the program may be recorded and available to the viewer.

Figure 4:
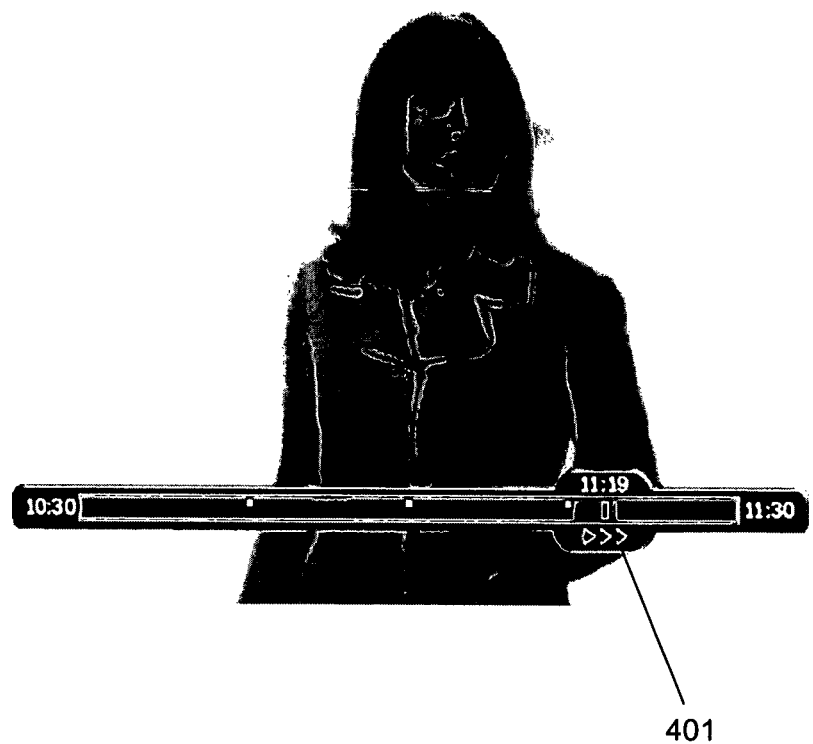
FIG. 4 is a diagram of a screenshot of a program playback mode according to the invention.

Referring to FIG. 4, DVRs allow the viewer to perform many trick play functions 401 on the program being viewed. The viewer can fast forward and rewind at multiple speeds, pause, single step, slow play, etc. through the program material using a remote input device such as the one depicted in FIG. 3. The viewer uses the play 303, reverse 304, pause 305, fast forward 306, and frame step 307 buttons to perform trick play functions. If the viewer is using a portable DVR or PC-based DVR, the viewer can access those functions via the keyboard or user interface.

The invention of time-shifting devices for television programs has also created the opportunity for television viewers to fast-forward through commercial advertisements if the viewer is watching a recorded program, or a live, cached program where the current viewing position is delayed from the current real-time television broadcast.

Since there is little economic incentive for viewers to watch commercials in those cases, the value of the space made available for advertising drops precipitously. However, in examining the behavior of viewers, it is apparent that a newly valuable advertising space has been created at the beginning or ending of a commercial break.

Figure 5:
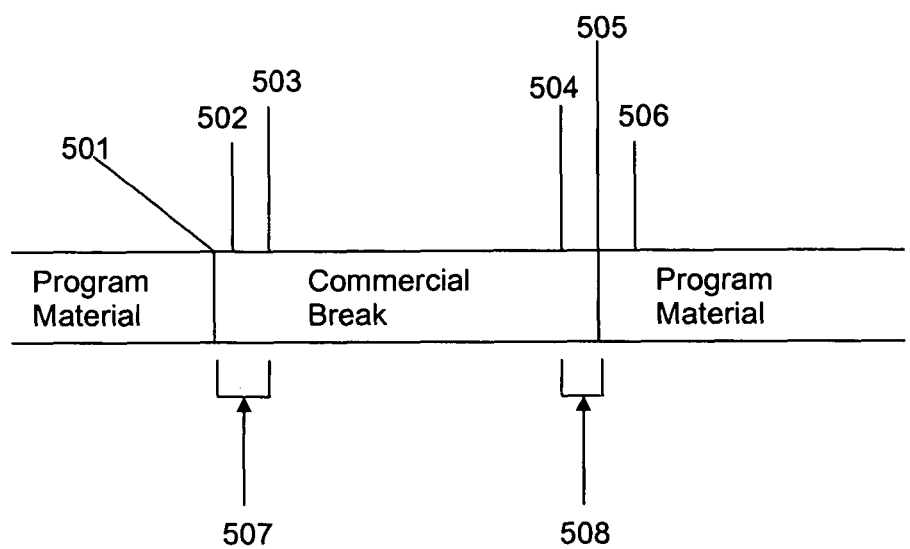
FIG. 5 is a block schematic diagram showing a viewer's response to a commercial break within a program according to the invention.

With respect to FIG. 5, an embodiment of the invention provides a method for enhancing the viewership of television ads on a DVR by taking into account the viewer's interaction with the inherent operation of the DVR. Whether the technique is a visual fast-forward (TiVo) or fixed-time (e.g., 30 seconds) skip function (ReplayTV), there is a delay from when the viewer realizes 502 that the program material has ended and advertising has begun 501, and when the viewer starts skipping the commercial using the remote input device 503. Several factors are involved in the viewer's response time. The viewer must first recognize 502 that the program material has ended 501. Once the viewer realizes that the event has occurred, he must then press a button 503 on the remote input device.

Often, the time span 507 from the end of the program 501 to the point where the viewer has pressed the button 503 is tens of seconds long. Thus, the first few seconds of any commercial break become extremely valuable as an opportunity to get the viewer to NOT skip the commercial break. Advertisers will pay additional money for the opportunity to occupy this space in the commercial breaks.

Similarly, when fast-forwarding or skipping, it is typical that the viewer will not be able to precisely skip to the beginning of the program material 505. When examining viewer behavior, most viewers will skip forward 506, then back up 504 into the preceding commercial break a few seconds in order to view all of the program material from the point where it starts 505. Therefore, the last few seconds of a commercial break 508 become extremely valuable, since it is an opportunity to persuade the viewer to rewind into the commercial break and view advertisements.

Figure 6:
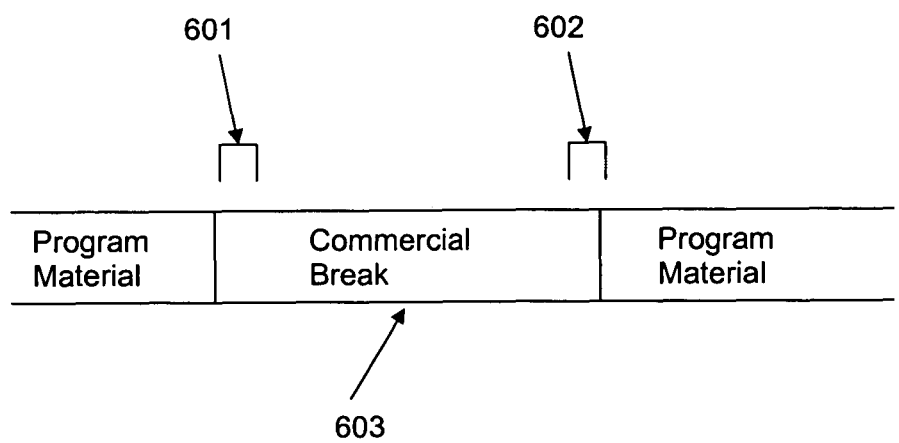
FIG. 6 is a block schematic diagram showing the important portions of a commercial break according to the invention.

Referring to FIG. 6, an embodiment of the invention provides a method wherein the first few seconds 601 or last few 602, are carefully authored to provide a "teaser" to entice the viewer to watch multiple commercials during the break 603. This teaser might be a set of images or logos that indicate a commercial relating to that advertiser is present or a menu or short sequence of animations designed to catch the viewer's attention and persuade him to watch the commercial break.

Figure 7:
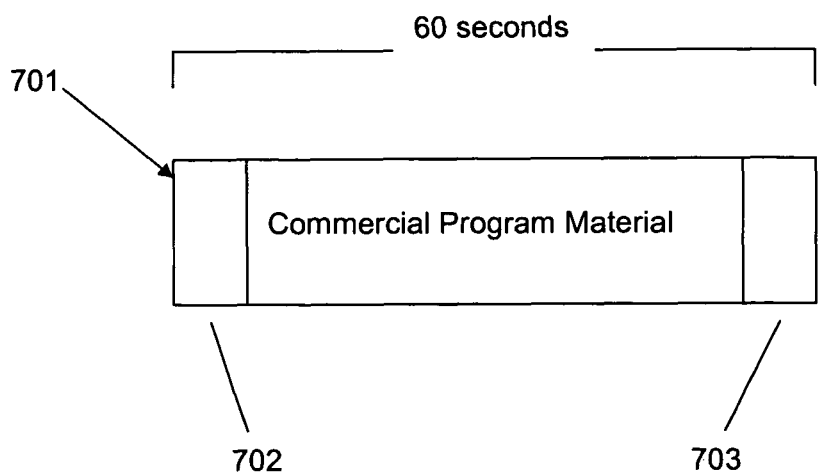
FIG. 7 is a block schematic diagram showing the important portions of a commercial according to the invention.

With respect to FIG. 7, advertisers can also place the more important content in the first 702 or last 703 number of seconds of their commercials 701. This content will be able to get the desired message across to the viewer in those seconds. Given this model, content providers are able to charge advertisers a higher rate to place their commercials at the beginning or the end of a commercial break.

Further, one can imagine using the CC tagging technology as described in application Ser. No. 09/665,921 entitled "Closed Caption Tagging System" owned by the Applicant, or similar technology such as ATVEF or Wink, to automatically pause the program being watched immediately at the beginning (or end) of the commercial break, with the frame being displayed containing a menu of the advertisements in the commercial break. The viewer might simply skip forward, or choose a particular commercial via a menu-like overlay on top of the broadcast image using the on screen display (OSD).

Another method used is described in U.S. Pat. No. 6,215, 526, filed on Nov. 6, 1998, entitled "Analog Video Tagging and Encoding System", owned by the Applicant. The network content provider authors an invisible tag at the beginning of the "pod" (the sequence of ad avails) that tells a decoder (such as TiVo's Time Warping System) what all the commercials in the pod are, thereby allowing the decoder to display an instant menu of ads.

Further, it is possible using the CC tagging technology, or similar techniques, to cause an "auto-pause" capability. For example, instead of presenting a menu, a short "teaser" image or multi-frame video could introduce an advertisement, and then automatically pause. The viewer might hit "play" to watch the advertisement or fast-forward to skip to the next advertisement, which would present a similar teaser and then pause. With a just few button presses, the viewer could skip the commercial break and start the program, or watch one or more advertisements in the break.

Another method to detect commercial breaks includes some signaling with the program stream that the DVR can detect. For example, include data in video line 21 (for analog and digital television broadcasts) or add digital data to a digital stream.

Expanding upon the ability to detect the beginning and end of commercial breaks, another embodiment of the invention detects when a viewer fast-forwards through a commercial break. The system plays alternate content while the viewer is fast-forwarding through the commercial break. The system can play several types of alternate content to the viewer. Some examples are:

- A fixed image. This could be displayed for the duration of a commercial or commercial break. Fixed images are an effective means of communication (e.g., billboards and print advertising).
- A slide show. If there is enough time during the commercial break, more than one fixed image can be displayed.
- A shortened video. For example, if the DVR is designed for 3× playback during fast-forward, a 10 second commercial could replace a 30 second commercial.

Any of the above options can be accompanied by alternate audio. Alternatively, the audio can be played through the fast-forwarded commercial or commercial break. This gives the DVR provider an alternate means for advertiser revenue and increased viewership through audio. The viewer must turn down the audio level to avoid the alternate audio track.

Any combination of the above options may be used, for example, a short video can play after a fixed image or an alternate audio can be played while a fixed image is being displayed. Even more interesting is that an alternate audio may be selected depending on the viewer's demographic and played over a short video. This would allow the advertiser to target audiences using the same video, but different narratives.

The above options may be selected by the system based on the speed of playback that the viewer is using. For example, if the viewer is fast-forwarding at 60× playback then a fixed image would be shown because the commercial break would be skipped in a very short time, but if the fast-forward is at 3× playback, then a short video can be shown.

The alternate content can either be delivered to the DVR or generated automatically. As described above, the DVR can automatically display the first frame of video in the commercial. This has the advantage of not requiring any additional data.

Content that is sent with the video stream, but is not displayed, can be played by the DVR. For example, an MPEG stream can include additional video, audio and/or data streams. The DVR can also play content that has been sent separately by any means available for communication to the DVR. Broadcasters can include alternate content in their program streams and the DVR can play the alternate content depending on configuration parameters.

Although fast-forward playback has been discussed above, the system can also apply the alternate content playback to slow motion or single-step playback modes.

The invention is not limited to DVRs, but can also be applied to video content delivered using other mechanisms (e.g., streaming video on a computer) or to audio content delivery systems (e.g., DVR-like devices for radio).

Further, although commercial breaks are mentioned throughout the text, the tagging methods available allow the invention to replace any section of program material with alternate content. For example, a radio or television show may have certain parts of a program that are not suitable for certain parts of the country and may tag the section of the program so the invention can play alternate content in place of the tagged section. When the program material is cached as in DVRs, the system can actually delay the program material until the alternate content is played if the alternate content is longer than the tagged section.

As noted above, the invention stores program material on a storage medium. A viewer accesses the programs through a user menu. The viewer selects the desired program by highlighting the appropriate program and pressing the select button. The viewer can also select program material by tuning to a given channel (virtual or physical) and viewing live or delayed (cached) content. Once the program is selected, it is then displayed.

Figure 8:
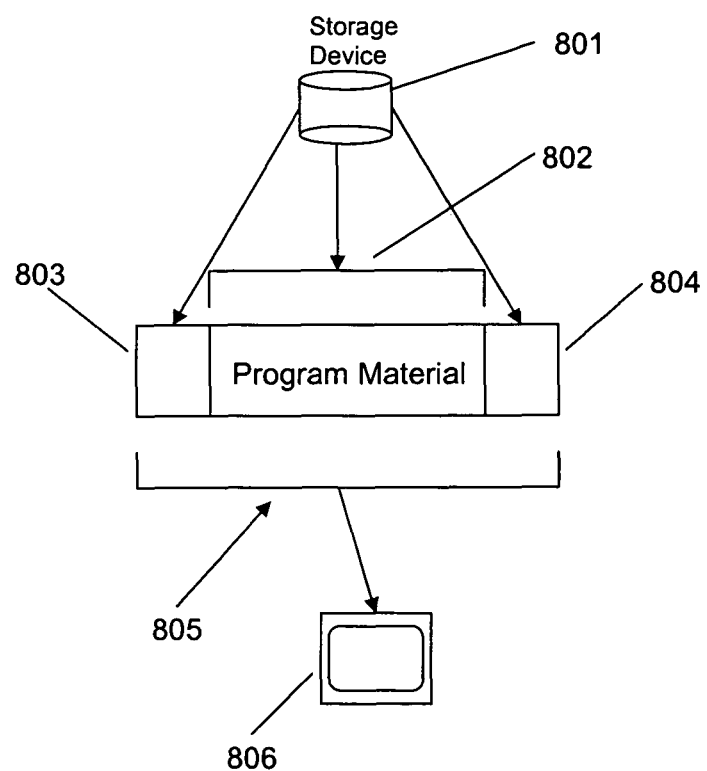
FIG. 8 is a block schematic diagram of an embodiment of the invention showing the bookending concept according to the invention.

Referring to FIG. 8, "bookending" concerns the display of the program material 802. The program 802 is indexed and retrieved from the Storage Device 801. Before the program 802 is displayed an ad 803 is first displayed before the program is run. Another ad 804 is then played after the program is over. The invention's bookending allows any ad material that is loaded onto the system to be displayed before and/or after any program material. The ads and program material 805 are displayed to the viewer 806.

The ads are stored on the Storage Device 801, indexed and, optionally, stored along with the characteristics of each ad. The choice is up to the DVR system or provider as to whether an ad is played before, after, or both before and after any program material.

Figure 9:
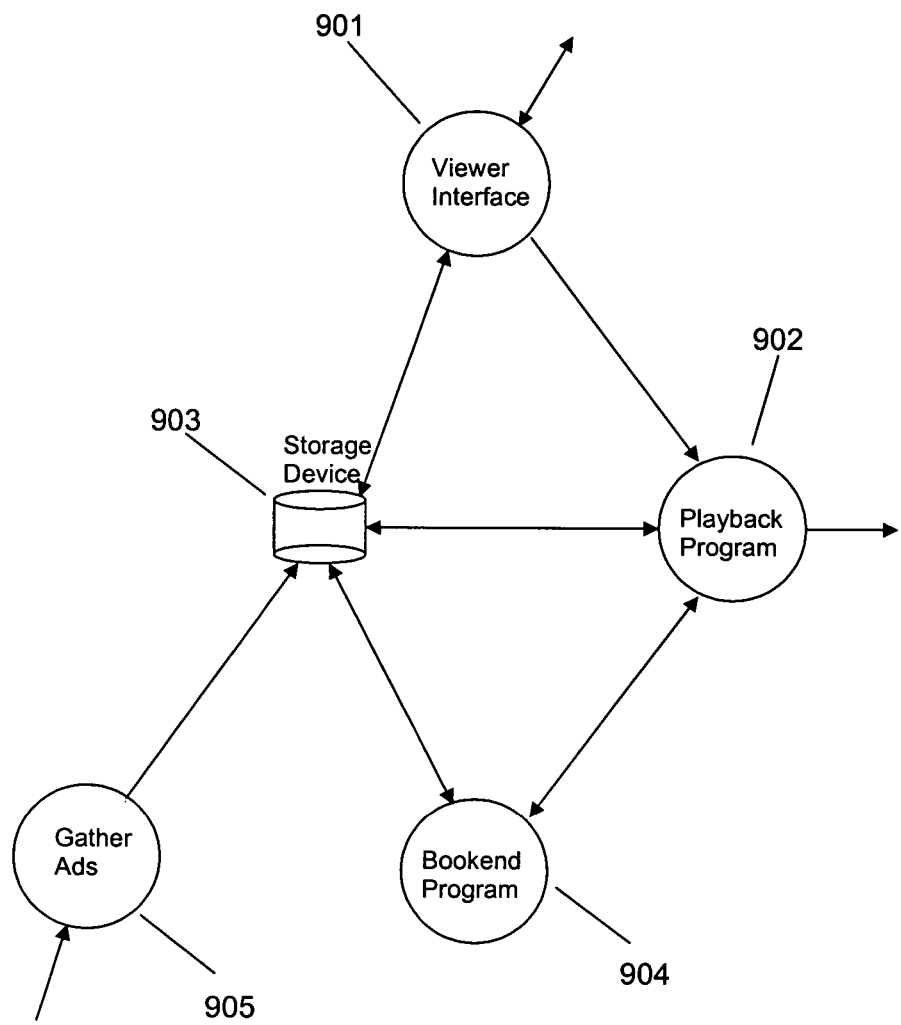
FIG. 9 is a block schematic diagram of high-level task viewpoint of an embodiment of the invention implementing the bookending function according to the invention.

With respect to FIG. 9, an embodiment of the invention stores program material and ads on the storage device 903. The Viewer Interface module 901 displays a list of stored or currently televised programs to the viewer and accepts the viewer program selections. The Playback Program module 902 finds and extracts the selected program from the Storage Device 903. For currently televised programs, the Playback Program module 902 switches the DVR tuner to the appropriate channel and the televised program is then stored to the Storage Device 903 and concurrently retrieved by the Playback Program module 902 from the Storage Device 903.

Bookending ads are selected by the Bookend Program module 904. The Bookend Program module 904 decides whether to display an ad before and/or after the program material—configurable by the DVR service provider. Each ad is selected from the Storage Device 903 by the Bookend Program module 904.

The Playback Program module 902 makes a request to the Bookend Program module 904 for an ad to display. The request is made before and after the Playback Program module 902 displays the program material. If an ad is passed to the Playback Program module 902 by the Bookend Program module 904, then it is displayed. Otherwise, the Playback Program module 902 continues on without displaying an ad.

Since the DVR system knows the viewer's program preferences (e.g., science fiction, police dramas) and, possibly, the viewer's personal information (e.g., male, age 27, likes photography), ads can be selected by the Bookend Program module 904 based on this information. The Bookend Program module 904 selects ads targeted to the specific audience that the viewer is a part of. This allows the DVR service provider to charge advertisers for targeted advertising which is much more valuable than shotgun advertising that occurs in normal television commercial breaks.

Ads are downloaded onto the Storage Device 903 via a modem, Ethernet, recorded at a predetermined time from an input source, etc. by the Download Ads module 905. The DVR can request ads from a central server or record certain groups of ads for the viewer's target audience.

Figure 10:
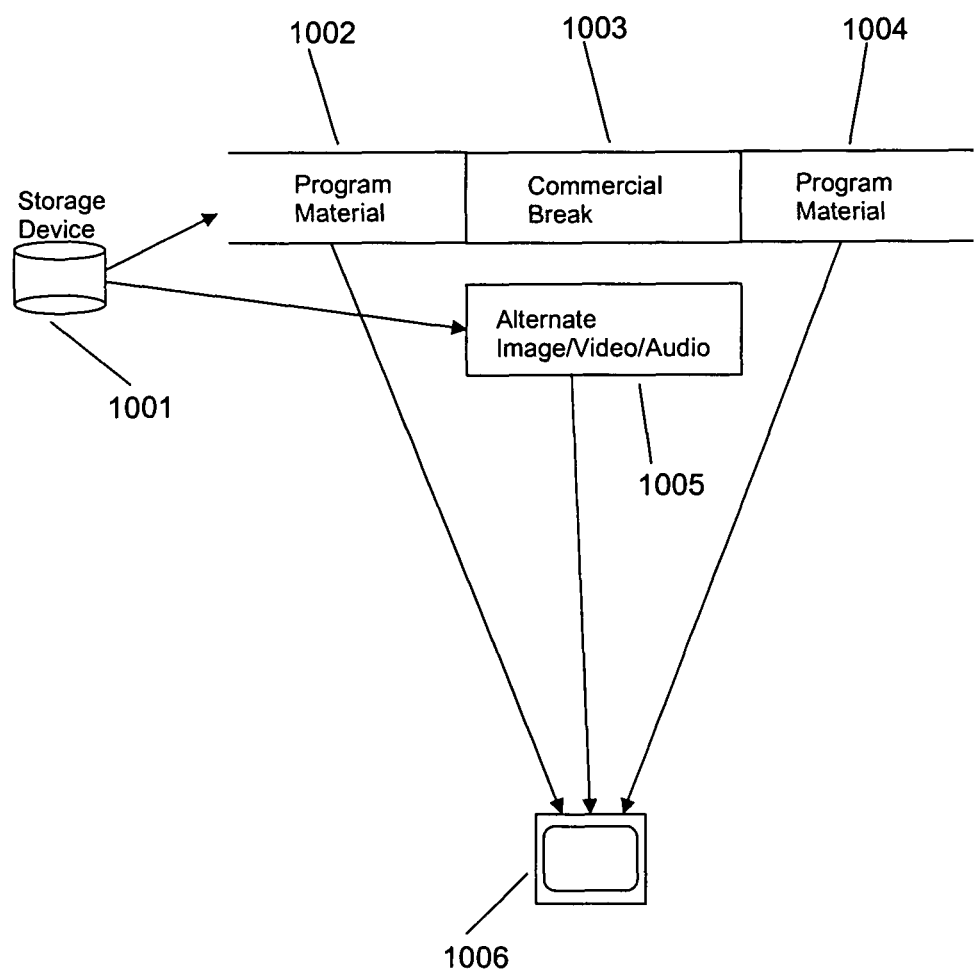
FIG. 10 is a block schematic diagram of an embodiment of the invention showing the concept of playing alternate material during high-speed playback of commercial breaks according to the invention.

FIG. 10 shows a system that plays alternate material during high-speed playback of commercial breaks. The program material is retrieved from the storage device 1001 and is played to the viewer 1006. The program material can be any multimedia program material. As the viewer 1006 views the program material 1002 the viewer recognizes that the commercial break 1003 has started and fast-forwards through the commercial break. The system detects the beginning of the commercial break 1003 and also detects that the viewer 1006 has switched to fast-forward mode.

The system retrieves an alternate image, video, and/or audio 1005 from the storage device 1001 and plays the alternate image, video, and/or audio 1005 to the viewer 1006. The system can play extended or display print ad versions of the alternate image, video, and/or audio 1005 upon the viewer's request. When the system detects the end of the commercial break 1003, it discontinues the playback of the alternate image, video, and/or audio 1005 and switches the viewer back to the program material 1004.

Figure 11:
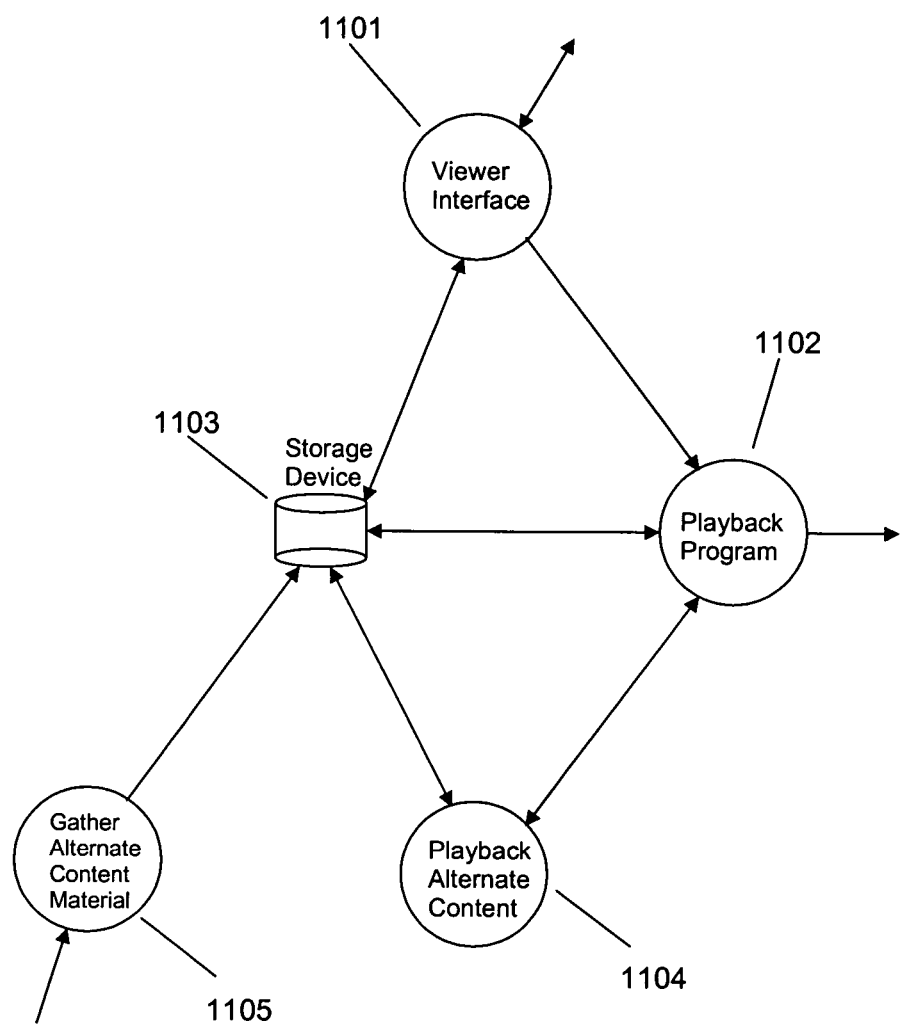
FIG. 11 is a block schematic diagram of high-level task viewpoint of an embodiment of the invention that plays alternate material during high-speed playback of commercial breaks according to the invention.

Referring to FIG. 11, an embodiment of the invention stores alternate image, video, and/or audio on the Storage Device 1103. The Viewer Interface module 1101 displays a list of stored or currently televised programs (or multimedia programs) to the viewer and accepts the viewer program selections. The Playback Program module 1102 finds and extracts the selected program from the Storage Device 1103. For currently televised programs, the Playback Program module 1102 switches the DVR tuner to the appropriate channel and the televised program is then stored to the Storage Device 1103 and concurrently retrieved by the Playback Program module 1102 from the Storage Device 1103.

The Playback Program module 1102 detects when a commercial break begins and if the viewer selects fast-forward playback mode during the commercial break, then the Playback Program module 1102 requests alternate content from the Playback Alternate Content module 1104.

There are a variety of ways for the Playback Alternate Content module 1104 to select the appropriate alternate content to be played back. For example, a play list is sent to the system that identifies channels and times for affected commercials. The play list can be delivered on a different channel, via a phone line, a network, or any other means there is to communicate with the system and stored on the Storage Device 1103.

Another example is that the Playback Alternate Content module 1104 can automatically detect the appropriate commercial either by the existence of an alternate content set for the specific commercial or by some advanced method such as pattern recognition. The Playback Alternate Content module 1104 uses this data to know that it must process the commercial during fast playback speed.

The Playback Alternate Content module 1104 is provided configuration information by the DVR service provider or broadcaster to identify what alternate content will be played, when it will be played and any additional processing tasks required. The information can also contain business data that identifies whether the system is authorized to play the alternate content.

The information can contain data such as:
Commercial identification.
Commercial duration. This allows finer calibration on the alternate content and what can be played at certain playback speeds.
Alternate content type.
Alternate content location (where it can be found by the system, for example, as part of the video stream, or where it was stored ahead of time on the DVR).
Alternate content processing.
Rules for when the alternate content is played.
Rules for data collection for billing (described below).

This information may also be included with the alternate content data. For example, the data may point to a place on the Storage Device 1103 where the alternate content exists. The alternate content data may include commercial duration, type and processing.

More than one set of alternate content for a specific commercial or commercial break can be provided to the system. The system can select which one to display based on a variety of factors such as user characteristics, time or date when played, or random selection. As an option, multiple playing may result in different content each time.

The system knows the viewer's program preferences (e.g., science fiction, police dramas) and, possibly, the viewer's personal information (e.g., male, age 27, likes photography), alternate content can be selected by the Playback Alternate Content module 1104 based on this information combined with any rules included in the information sent by the DVR service provider. This allows for content targeted to the specific audience that the viewer is a part of. This also allows the DVR service provider to charge advertisers for targeted advertising which is much more valuable than shotgun advertising that occurs in normal television commercial breaks. If the alternate content is content other than ads, the DVR service provider can charge a fee to content providers for viewership of alternate content. Fees can be charged to an advertiser, content provider, or broadcaster based on viewership, targeting to a specific set of users, targeting to a demographic, etc.

To support more advanced business models, the system can collect data regarding the playing of alternate content. For example, it could be simple to count how many viewers watched a certain video. This can be used for statistical or for billing purposes. More advanced collection can identify times played and whether commercials were played at full speed. Data can also be generated that would be valuable for lead generation.

Once the Playback Alternate Content module 1104 selects the appropriate alternate content from the Storage Device 1103 or from the program stream, it passes the alternate content to the Playback Program module 1102. As described above, the Playback Alternate Content module 1104 can retrieve alternate content from the program stream itself. The alternate content is not normally displayed in the program stream, but is accessible by the system. The alternate content is extracted from the program stream by the Playback Alternate Content module 1104. The Playback Program module 1102 plays the alternate content to the viewer.

The viewer can get an extended version of the alternate content by selecting a specific function on remote control, e.g., slow motion. The Playback Program module 1102 notifies the Playback Alternate Content module 1104 to retrieve an extended version of the alternate content. The Playback Alternate Content module 1104 retrieves an extended version of the alternate content from the Storage Device 1103 and passes it to the Play back Program module 1102. The Playback Program module 1102 plays the extended alternate content to the viewer.

The viewer can also get a print ad version of the alternate content by selecting a specific function on the remote control, e.g., pause. The print ad version can contain full product information, contact information, local stores, etc. The Playback Program module 1102 notifies the Playback Alternate Content module 1104 to retrieve a print ad version of the alternate content. The Playback Alternate Content module 1104 retrieves a print ad version of the alternate content from the Storage Device 1103 and passes it to the Play back Program module 1102. The Playback Program module 1102 displays the print ad to the viewer.

When the Playback Program module 1102 detects that the commercial break has ended, it returns the viewer back to the program material.

The Gather Alternate Content Material module 1104 receives alternate content from the DVR service provider via connections such as satellite, cable, WAN, Internet, telephone lines, etc. The Gather Alternate Content Material module stores the alternate content on the Storage Device 1103. Configuration information that pertains to the alternate content is also received by the Gather Alternate Content Material module 1104 and stored on the Storage Device 1103.

Alternate content can also be stored remotely on a network accessible storage device and accessed by the Gather Alternate Content Material module 1104 when needed. For example, a DVR can access other networked DVRs that have stored the appropriate alternate content on their local storage devices.

Although broadcast networks have been described above, the system can also apply to other delivery systems such as point-to-point networks and other network topologies.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for playing alternate content during playing of a video segment at a receiver, comprising:
    detecting, at the receiver, a beginning of the video segment during playing of a multimedia program;
    receiving information, at the receiver, from a service provider, identifying a plurality of alternate contents to present while fast-forwarding, the plurality of alternate contents comprising particular alternate content and extended alternate content, the extended alternate content being an extended version of the particular alternate content;
    responsive to fast-forwarding during the video segment, the receiver presenting at least one of the plurality of alternate contents, including the particular alternate content;
    responsive to receiving a request to pause certain alternate content of the plurality of alternate contents, retrieving and presenting a print version of the certain alternate content that comprises one or more of product information, contact information, or a store location;
    responsive to receiving particular input while presenting the particular alternate content, presenting the extended alternate content;
    after presenting the extended alternate content, resuming playback of the multimedia program at the end of the video segment;
    wherein the method is performed by the receiver, comprising at least one processor.

2. The method of claim 1, wherein the multimedia program is stored on a local storage device.

3. The method of claim 1, wherein the video segment is a commercial break, wherein different alternate content is selected for each specific commercial in the commercial break.

4. The method of claim 1, wherein the particular alternate content is one of: an video stream, an image; or an alternate audio stream that is displayed while presenting the fast-forwarded playback of original video content from the video segment.

5. The method of claim 1, wherein the plurality of alternate content further comprises a first frame of one or more commercials in the video segment.

6. The method of claim 1, further comprising:
    receiving configuration information for determining when certain alternate content is played; and
    selecting, at the receiver, which alternate content from the plurality of alternate contents to present while fast-forwarding during the video segment, the selecting step using the configuration information to select the particular alternate content from the plurality of alternate contents.

7. The method of claim 1, further comprising:
    returning back to normal playback of the multimedia program upon detection of the end of the video segment.

8. The method of claim 1, further comprising selecting, at the receiver, which alternate content from the plurality of alternate contents to present while fast-forwarding during the video segment, the selecting step selecting the particular alternate content based on a user's personal data and/or viewing preferences.

9. The method of claim 1, further comprising:
    receiving alternate content sets; and
    storing the alternate content sets on a local storage device.

10. The method of claim 1, wherein at least some of the plurality of alternate content is contained in the multimedia program, and wherein the at least some of the plurality of alternate content is extracted from the multimedia program.

11. The method of claim 1, further comprising the receiver reporting to the service provider how often the particular alternate content is played, wherein the service provider charges an advertiser or content provider a fee based on how often the particular alternate content is played.

12. The method of claim 1, wherein the video segment comprises a tagged section and wherein detecting the beginning of the video segment comprises detecting the beginning of the tagged section.

13. An apparatus for playing alternate content during playing of commercials, comprising:
a processor;
logic, implemented at least partially by hardware, configured to detect a beginning of a video segment during playing of a multimedia program;
logic, implemented at least partially by hardware, configured to receive information, from a service provider, identifying a plurality of alternate contents to present while fast-forwarding, the plurality of alternate contents comprising particular alternate content and extended alternate content, the extended alternate content being an extended version of the particular alternate content;
logic, implemented at least partially by hardware, configured to, responsive to fast-forwarding during the video segment, the receiver presenting at least one of the plurality of alternate contents, including the particular alternate content;
logic, implemented at least partially by hardware, configured to, responsive to receiving a request to pause certain alternate content of the plurality of alternate contents, retrieving and presenting a print version of the certain alternate content that comprises one or more of product information, contact information, or a store location;
logic, implemented at least partially by hardware, configured to, responsive to receiving particular input while presenting the particular alternate content, present the extended alternate content;
logic, implemented at least partially by hardware, configured to, after presenting the extended alternate content, resume playback of the multimedia program at the end of the video segment.

14. The apparatus of claim 13, wherein the multimedia program is stored on a local storage device.

15. The apparatus of claim 13, wherein the video segment is a commercial break, wherein different alternate content is selected for each specific commercial in the commercial break.

16. The apparatus of claim 13, wherein the particular alternate content is one of: an video stream, an image; or an alternate audio stream that is displayed while presenting the fast-forwarded playback of original video content from the video segment.

17. The apparatus of claim 13, wherein the plurality of alternate content further comprises a first frame of one or more commercials in the video segment.

18. The apparatus of claim 13, further comprising:
logic, implemented at least partially by hardware, configured to return back to normal playback of the multimedia program upon detection of the end of the video segment.

19. The apparatus of claim 13, further comprising logic, implemented at least partially by hardware, configured to, select which alternate content from the plurality of alternate contents to present while fast-forwarding during the video segment, the selecting step selecting the particular alternate content based on a user's personal data and/or viewing preferences.

20. The apparatus of claim 13, further comprising:
logic, implemented at least partially by hardware, configured to, receive alternate content sets; and
logic, implemented at least partially by hardware, configured to store the alternate content sets on a local storage device.

21. The apparatus of claim 13, wherein at least some of the plurality of alternate content is contained in the multimedia program, and wherein the at least some of the plurality of alternate content is extracted from the multimedia program.

22. The apparatus of claim 13, further comprising logic, implemented at least partially by hardware, configured to report to the service provider how often the particular alternate content is played, wherein the service provider charges an advertiser or content provider a fee based on how often the particular alternate content is played.

23. The apparatus of claim 13, wherein the video segment comprises a tagged section and wherein detecting the beginning of the video segment comprises detecting the beginning of the tagged section.

24. A non-transitory program storage medium readable by a computing device, storing instructions executable by the computing device to perform method steps comprising:
detecting a beginning of a video segment during playing of a multimedia program;
receiving information, from a service provider, identifying a plurality of alternate contents to present while fast-forwarding, the plurality of alternate contents comprising particular alternate content and extended alternate content, the extended alternate content being an extended version of the particular alternate content;
responsive to fast-forwarding during the video segment, the receiver presenting at least one of the plurality of alternate contents, including the particular alternate content;
responsive to receiving a request to pause certain alternate content of the plurality of alternate contents, retrieving and presenting a print version of the certain alternate content that comprises one or more of product information, contact information, or a store location;
responsive to receiving particular input while presenting the particular alternate content, presenting the extended alternate content;
after presenting the extended alternate content, resuming playback of the multimedia program at the end of the video segment.

25. The program storage medium of claim 24, wherein the multimedia program is stored on a local storage device.

26. The program storage medium of claim 24, wherein the video segment is a commercial break, wherein different alternate content is selected for each specific commercial in the commercial break.

27. The program storage medium of claim 24, wherein the particular alternate content is one of: an video stream, an image; or an alternate audio stream that is displayed while presenting the fast-forwarded playback of original video content from the video segment.

28. The program storage medium of claim 24, wherein the plurality of alternate content further comprises a first frame of one or more commercials in the video segment.

29. The program storage medium of claim 24, the method steps further comprising:
receiving configuration information for determining when certain alternate content is played; and
selecting which alternate content from the plurality of alternate contents to present while fast-forwarding during the video segment, the selecting step using the configuration information to select the particular alternate content from the plurality of alternate contents.

30. The program storage medium of claim 24, the method steps further comprising:
    returning back to normal playback of the multimedia program upon detection of the end of the video segment.

31. The program storage medium of claim 24, the method steps further comprising selecting which alternate content from the plurality of alternate contents to present while fast-forwarding during the video segment, the selecting step selecting the particular alternate content based on a user's personal data and/or viewing preferences.

32. The program storage medium of claim 24, the method steps further comprising:
    receiving alternate content sets; and
    storing the alternate content sets on a local storage device.

33. The program storage medium of claim 24, wherein at least some of the plurality of alternate content is contained in the multimedia program, and wherein the at least some of the plurality of alternate content is extracted from the multimedia program.

34. The program storage medium of claim 24, the method steps further comprising the receiver reporting to the service provider how often the particular alternate content is played, wherein the service provider charges an advertiser or content provider a fee based on how often the particular alternate content is played.

35. The program storage medium of claim 24, wherein the video segment comprises a tagged section and wherein detecting the beginning of the video segment comprises detecting the beginning of the tagged section.

36. A method for determining a fee for playing alternate content on a media device during a broadcast or recorded program, comprising:
    detecting, at the media device, a beginning of a commercial break during playing of a multimedia program, the commercial break comprising a particular sequence of one or more commercials;
    receiving information, at the media device, from a service provider, identifying a plurality of alternate commercials to present while fast-forwarding, the plurality of alternate commercials comprising a particular alternate commercial and an extended alternate commercial, the extended alternate commercial being an extended version of the particular alternate commercial;
    responsive to fast-forwarding during the commercial break, selecting, at the media device, at least the particular alternate commercial from the plurality of alternate commercials to present while fast-forwarding during the commercial break;
    further responsive to fast-forwarding during the video segment, the media device presenting at least one of the plurality of alternate commercials, including the particular alternate commercial;
    responsive to receiving a request to pause a certain alternate commercial of the plurality of alternate commercials, retrieving and presenting a print version of the certain alternate commercial that comprises one or more of product information, contact information, or a store location;
    responsive to receiving particular input while presenting the particular alternate commercial, presenting the extended alternate commercial;
    reporting, from the media device, to the service provider, that the extended alternate commercial was played;
    based on the reporting, the service provider charging an advertiser, content provider, or broadcaster a fee for playing the extended alternate commercial.

37. The method of claim 36, wherein the selecting step selects the particular alternate commercial based on a user's personal data and/or viewing preferences, and wherein the charging step charges the advertiser, content provider, or broadcaster a fee for targeting the extended alternate commercial to specific users.

38. The method of claim 1, wherein the particular alternate content is stored on a remote storage device.

39. The method of claim 1, further comprising:
    collecting data associated with the playing of the particular alternate content.

40. The method of claim 1, further comprising:
    collecting data regarding whether commercials in the video segment were played at full speed.

41. The method of claim 1, further comprising:
    detecting playing of a portion of the video segment in slow motion;
    displaying the extended alternate content in response to detecting the playing of the portion of the video segment in slow motion.

42. The apparatus of claim 13, wherein the particular alternate content is stored on a remote storage device.

43. The apparatus of claim 13, further comprising:
    logic, implemented at least partially by hardware, configured to collect data associated with the playing of the particular alternate content.

44. The apparatus of claim 13, further comprising:
    logic, implemented at least partially by hardware, configured to collect data regarding whether commercials in the video segment were played at full speed.

45. The apparatus of claim 13, further comprising:
    logic, implemented at least partially by hardware, configured to detect playing of a portion of the video segment in slow motion;
    logic, implemented at least partially by hardware, configured to display the extended alternate content in response to detecting the playing of the portion of the video segment in slow motion.

46. The program storage medium of claim 24, wherein the particular alternate content is stored on a remote storage device.

47. The program storage medium of claim 24, the method steps further comprising:
    collecting data associated with the playing of the particular alternate content.

48. The program storage medium of claim 24, the method steps further comprising:
    collecting data regarding whether commercials in the video segment were played at full speed.

49. The program storage medium of claim 24, the method steps further comprising:
    detecting playing of a portion of the video segment in slow motion;
    displaying the extended alternate content in response to detecting the playing of the portion of the video segment in slow motion.

50. The method as recited in claim 1, wherein the video segment is detected based on pattern recognition.

51. The apparatus as recited in claim 13, wherein the video segment is detected based on pattern recognition.

52. The program storage medium as recited in claim 24, wherein the video segment is detected based on pattern recognition.

53. The method of claim 1, further comprising selecting, at the receiver, which alternate content from the plurality of alternate contents to present while fast-forwarding during the video segment, the selecting step selecting the particular alternate content from the plurality of alternate contents based on a speed of the fast-forwarding.

54. The apparatus of claim 13, further comprising logic, implemented at least partially by hardware, configured to select which alternate content from the plurality of alternate contents to present while fast-forwarding during the video segment, the selecting step selecting the particular alternate content from the plurality of alternate contents based on a speed of the fast-forwarding.

55. The program storage medium of claim 24, the method steps further comprising selecting, at the receiver, which alternate content from the plurality of alternate contents to present while fast-forwarding during the video segment, the selecting step selecting the particular alternate content from the plurality of alternate contents based on a speed of the fast-forwarding.

56. The method of claim 1, further comprising: detecting the fast-forwarding during the video segment in response to detecting an input during the video segment requesting a fast-forward mode or detecting that the receiver entered playback of the video segment already in the fast-forward mode.

57. The method of claim 1, further comprising: delaying the playing of the multimedia program material while the extended alternate content is played.

58. The apparatus of claim 13, further comprising logic, implemented at least partially by hardware, configured to detect the fast-forwarding during the video segment in response to detecting an input during the video segment requesting a fast-forward mode or detecting that the receiver entered playback of the video segment already in the fast-forward mode.

59. The apparatus of claim 13, further comprising logic, implemented at least partially by hardware, configured to delay the playing of the multimedia program material while the extended alternate content is played.

60. The program storage medium of claim 24, the method steps further comprising: detecting the fast-forwarding during the video segment in response to detecting an input during the video segment requesting a fast-forward mode or detecting that the receiver entered playback of the video segment already in the fast-forward mode.

61. The program storage medium of claim 24, the method steps further comprising: delaying the playing of the multimedia program material while the extended alternate content is played.

62. The method of claim 1, wherein the particular input indicates a request for a slow-motion or single-step playback mode.

63. The method of claim 1, wherein the extended alternate content is an extended version of the particular alternate content.

64. The method of claim 1, further comprising receiving the plurality of alternate contents and the multimedia program within separate data streams of an MPEG stream.

65. The method of claim 1, further comprising receiving the plurality of alternate contents separately from the multimedia program.

66. The apparatus of claim 13, further comprising:
comprising logic, implemented at least partially by hardware, configured to receive configuration information for determining when certain alternate content is played; and
comprising logic, implemented at least partially by hardware, configured to select, at the receiver, which alternate content from the plurality of alternate contents to present while fast-forwarding during the video segment, the selecting step using the configuration information to select the particular alternate content from the plurality of alternate contents.

67. The apparatus of claim 13, wherein the particular input indicates a request for a slow-motion or single-step playback mode.

68. The apparatus of claim 13, wherein the extended alternate content is an extended version of the particular alternate content.

69. The apparatus of claim 13, further comprising logic, implemented at least partially by hardware, configured to receive the plurality of alternate contents and the multimedia program within separate data streams of an MPEG stream.

70. The apparatus of claim 13, further comprising logic, implemented at least partially by hardware, configured to receive the plurality of alternate contents separately from the multimedia program.

71. The program storage medium of claim 24, wherein the particular input indicates a request for a slow-motion or single-step playback mode.

72. The program storage medium of claim 24, wherein the extended alternate content is an extended version of the particular alternate content.

73. The program storage medium of claim 24, further comprising receiving the plurality of alternate contents and the multimedia program within separate data streams of an MPEG stream.

74. The program storage medium of claim 24, further comprising receiving the plurality of alternate contents separately from the multimedia program.

75. The method of claim 1, wherein the certain alternate content is the particular alternate content.

76. The apparatus of claim 13, wherein the certain alternate content is the particular alternate content.

77. The program storage medium of claim 24, wherein the certain alternate content is the particular alternate content.

* * * * *